(12) United States Patent
Bock

(10) Patent No.: US 6,693,505 B2
(45) Date of Patent: Feb. 17, 2004

(54) INDUCTANCE ELEMENT FOR POWER CAPACITOR ASSEMBLY

(75) Inventor: Larry Edward Bock, South Glens Falls, NY (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 09/768,421

(22) Filed: Jan. 24, 2001

(65) Prior Publication Data

US 2002/0097123 A1 Jul. 25, 2002

(51) Int. Cl.[7] ............................................... H01F 29/00
(52) U.S. Cl. ........................... 336/69; 336/70; 336/223; 361/270
(58) Field of Search ............................ 336/69, 70, 223, 336/177; 315/244, 276, 283; 361/270

(56) References Cited

U.S. PATENT DOCUMENTS

| 3,704,390 A | * | 11/1972 | Grahame | 315/276 |
| 4,327,311 A | * | 4/1982 | Wroblewski | 315/244 |
| 5,153,812 A | * | 10/1992 | Naito | 361/270 |
| 5,844,460 A | * | 12/1998 | Bogdan et al. | 336/177 |

* cited by examiner

Primary Examiner—Lincoln Donovan
Assistant Examiner—Jennifer A. Poker
(74) Attorney, Agent, or Firm—Cantor Colburn LLP

(57) ABSTRACT

An inductive element is integrally configurable within a power capacitor assembly. The inductive element includes a plurality of electrically conductive sheets electrically connected in parallel, and which sheets are rolled and formed into a generally cylindrical body. A first electrode is in electrical contact with one end of the electrically conductive sheets, and a second electrode is in electrical contact with the opposite end of the electrically conductive sheets.

14 Claims, 2 Drawing Sheets

_US 6,693,505 B2_

INDUCTANCE ELEMENT FOR POWER CAPACITOR ASSEMBLY

BACKGROUND OF THE INVENTION

This invention relates generally to power capacitor assemblies used in power transmission and distribution systems and, more particularly, to an inductance element for a power capacitor assembly.

Electrical utility networks supply power for both commercial and residential purposes. In typical power networks, transmission lines carry both real and reactive power. The reactive power usually energizes cables, switches large industrial gears, and energizes reactive loads (e.g. motors and transformer coils), whereas the real power carried by the distribution lines performs the work at the load connected to the line. Multiphase, alternating current (AC) electrical networks tend to undergo undesirable reactive power changes when subjected to the repeated connection and disconnection of large reactive loads onto and off of the distribution line. The reactive power changes that occur in the network generally result in low system efficiency and high-energy losses. More specifically, these energy losses occur, for example, when large inductive loads are connected to the distribution lines, thus producing in inordinate amount of lagging reactive current in the line. Accordingly, it is desirable to provide a compensation system to correct for such reactive power in the electrical line.

For this purpose, one compensation technique is to use a number of high voltage capacitor banks, each of which can be selectively connected or disconnected from the network depending on the particular need for correction. High voltage capacitor units typically have both very low equivalent series resistance and inductance values, with the inductance values typically being on the order of 1 microhenry ($\mu$H). A low series resistance is desirable in order to limit power losses, while a low inductance is sometimes desirable in applications where it is advantageous to transfer energy out of a capacitor very rapidly. However, such low inductance characteristics can result in high inrush current transients when the capacitor is energized, particularly when there are multiple capacitor banks at the same location. In turn, high inrush current transients impose severe duty on associated switching devices, fuses, and the capacitors themselves.

In order to control high current transients, it is known in the art to externally connect a bank of reactors, or coils, to power capacitor assemblies. These external reactors act a "current choke" which protect the capacitors and help to maintain rupture tolerance. However, the use of large external components, such as reactor banks, can contribute to increased costs and maintenance of the power network.

Integrated inductor-capacitor devices (also referred to as cap-reactors) are also known in the art. These devices may include a pair of conducting foil sheets separated by a thin layer of dielectric material. The foil sheets and dielectric material are then typically rolled together in a cylindrical fashion to form a capacitor, having connective terminals protruding from the cylinder. In order to provide this type of capacitor with an inductive function, one connective terminal is usually located at the "start end" of the length of the first conductive foil and another connective terminal at the "finish end" of the second conductive foil. Although this arrangement produces an increased inductance value for the device (on the order of 100–200 $\mu$H), it also results in a relatively high equivalent series resistance. The series resistance can be approximately 30 times that of the entire capacitor since the length of the conducting path may be 100 or more feet long, depending on the size of the capacitor. This high equivalent series resistance would result in high thermal losses in the capacitor and adversely impact the efficiency of the power system.

A need, therefore, exists for a power capacitor assembly that addresses the aforementioned drawbacks.

BRIEF SUMMARY OF THE INVENTION

The above discussed and other drawbacks and deficiencies are overcome or alleviated by an inductive element integrally configurable within a power capacitor assembly. In an exemplary embodiment of the invention, the inductive element includes a plurality of electrically conductive sheets electrically connected in parallel. The sheets are rolled and formed into a generally cylindrical body. A first electrode is in electrical contact with one end of the electrically conductive sheets, and a second electrode in electrical contact with the opposite end of the electrically conductive sheets.

In one embodiment, the plurality of electrically conductive sheets is comprised of aluminum foil. Further, a layer of dielectric film material is disposed on one side of the plurality of electrically conductive sheets. The dielectric film material is preferably comprised of polypropylene, and the first and second electrodes are comprised of tinned copper straps.

BRIEF DESCRIPTION OF THE DRAWINGS

Referring to the exemplary drawings wherein like elements are numbered alike in the several Figures.

DETAILED DESCRIPTION OF THE INVENTION

Figure 1:
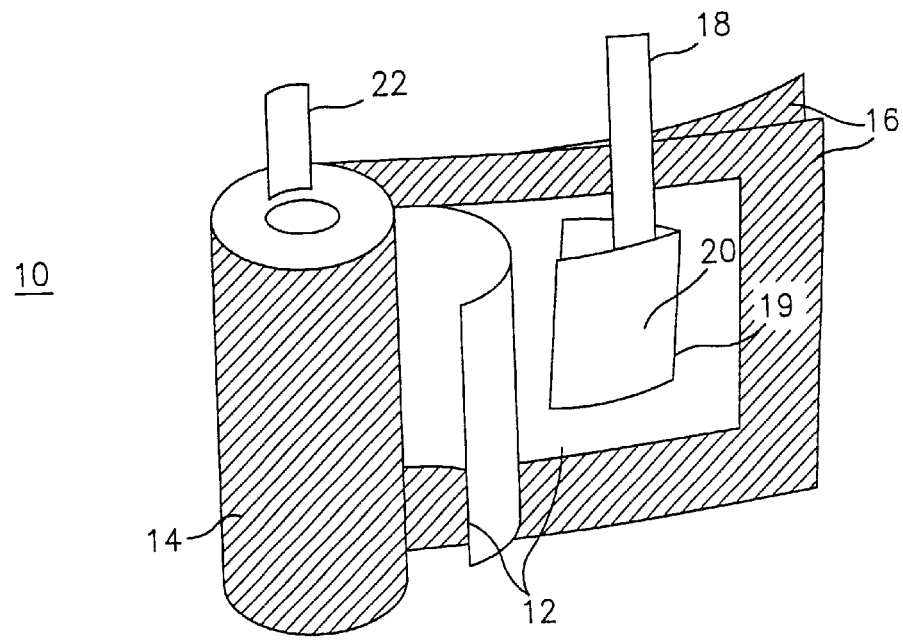
FIG. 1 is a perspective view of a cylindrically shaped inductive element of an embodiment of the invention, shown partially unwound to reveal the configuration of materials contained therein.

Referring to FIG. 1, an inductive element 10 includes a plurality of electrically conductive, metallic foil sheets 12 wound about a longitudinal axis to form a generally cylindrical body 14. Disposed on one side of the metallic sheets 12 are two layers 16 of a dielectric film material, preferably polypropylene, which have a width greater than that of the metallic foil sheets 12. The dielectric layers 16 are used to provide electrical insulation for voltage transients. A first electrode 18 is connected on one end 19 of the length of the metallic foil sheets 12 by an electrode pocket 20. A second electrode 22 is similarly connected to the opposite end (not shown) of the length of sheets 12. The first and second electrodes include longitudinal axes, which may be substantially parallel to the longitudinal axis of body 14.

In a preferred embodiment, metallic sheets 12 are comprised of aluminum foil, with each individual sheet being thicker than 0.2 mil. In addition, the first and second electrodes 18, 22 are preferably 1 inch wide, 20 mil thick tinned copper straps. Electrodes 18, 22 are desired to have increased current carrying capacity in comparison to connecting terminals used in power capacitors, which connecting terminals are typically only 0.5 inches wide by 3.5 mil thick.

Figure 2:
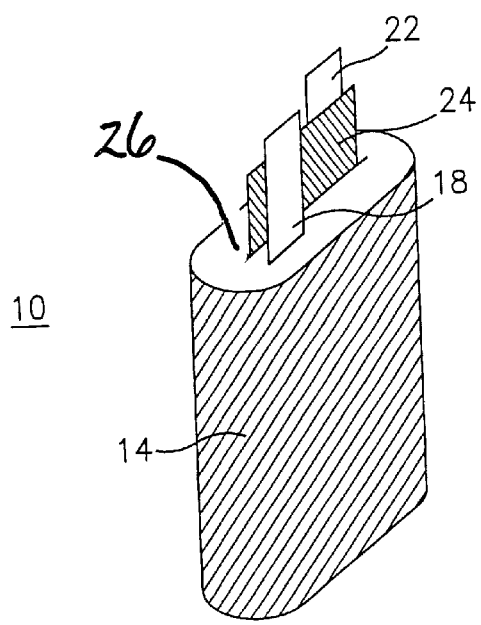
FIG. 2 is a perspective view of the inductive element depicted in FIG. 1, after being flattened during manufacture.
Figure 3:
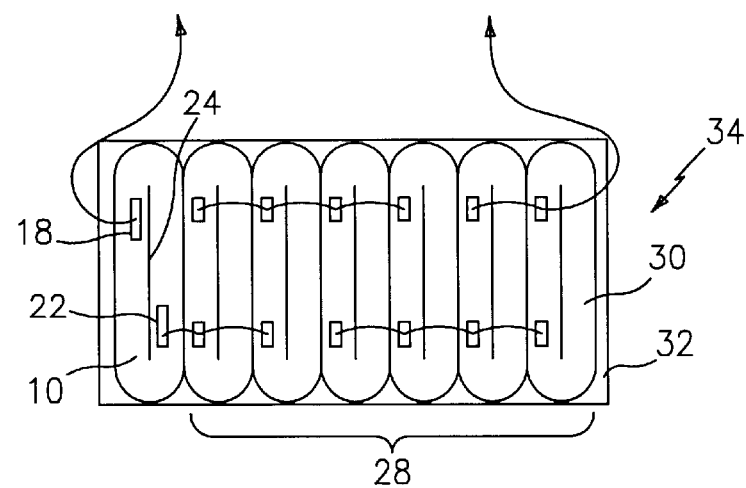
FIG. 3 is a top view of a power capacitor assembly, including the inductive element shown in FIG. 2.
Figure 4:
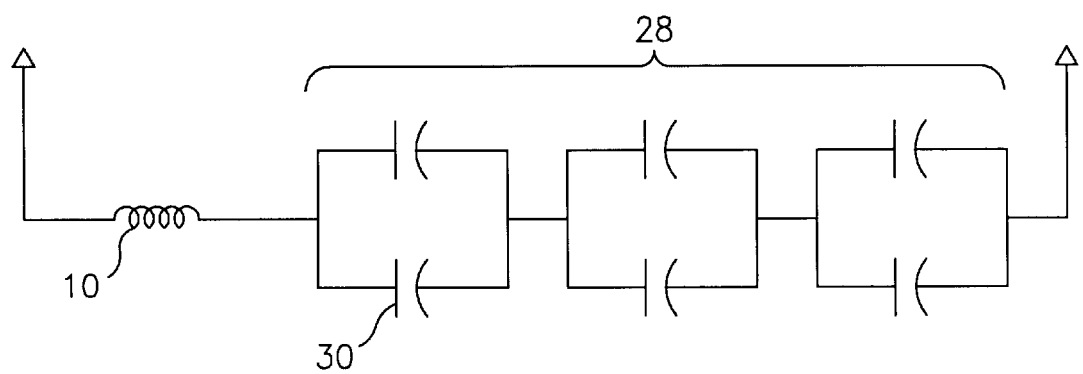
FIG. 4 is a schematic representation of the power capacitor assembly in FIG. 3.

After being spirally wound on a retractable arbor or similar machine, the cylindrical body 14 is then flattened into the shape shown in FIG. 2 and an insulation material 24 is inserted into a slot 26 formed by the flattening process. Body 14, once flattened, may be inserted into a housing, as described hereinafter.

It can readily be seen that the shape and design of the inductive element lends itself to integration with a wound foil capacitor assembly. An important difference, however, between a capacitor of the wound foil capacitor type and the present invention is that the metallic foil sheets 14 in inductive element 10 are not electrically isolated from one another by a dielectric material, but rather are electrically connected in parallel. As mentioned previously, a foil wound capacitor could be configured to have inductive properties by locating connecting terminals at opposite ends of the electrode sheets, but the resulting increased resistance leads to undesirable power losses.

It can readily be seen that the shape and design of the inductive element 10 lends itself to integration with a wound foil capacitor assembly. An important difference, however, between a capacitor of the wound foil capacitor type and the present invention is that the metallic foil sheets 12 in inductive element 10 are not electrically isolated from one another by a dielectric material, but rather are electrically connected in parallel. As mentioned previously, a foil wound capacitor could be configured to have inductive properties by locating connecting terminals at opposite ends of the electrode sheets, but the resulting increased resistance leads to undesirable power losses.

By featuring a comparative shape, design and materials features, the inductive element can easily be incorporated or manufactured into a bank of wound foil capacitors, thereby eliminating the need for (or reducing the size of) a separate reactor component.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An inductive element integrally configurable within a power capacitor assembly, said inductive element comprising:
   a plurality of electrically conductive sheets electrically connected in parallel, said plurality of electrically conductive sheets rolled and formed into a generally cylindrical body;
   a first electrode in electrical contact with a first end of said electrically conductive sheets; and
   a second electrode in electrical contact with a second end of said electrically conductive sheets;
   wherein two of said plurality of electrically conductive sheets are electrically connected in parallel along their length and are absent a dielectric layer disposed therebetween.

2. The inductive element of claim 1, wherein said plurality of electrically conductive sheets is comprised of aluminum foil.

3. The inductive element of claim 1, further comprising a layer of dielectric film material disposed on one side of said plurality of electrically conductive sheets.

4. The inductive element of claim 3, wherein said dielectric film material is polypropylene.

5. The inductive element of claim 1, wherein said first and second electrodes comprise tinned copper straps.

6. A power capacitor assembly, comprising:
   a housing;
   a power capacitor disposed within said housing; and
   an induction element serially connected with said power capacitor, said inductive element further comprising:
   a plurality of electrically conductive sheets electrically connected in parallel, said plurality of electrically conductive sheets rolled and formed into a generally cylindrical body;
   a first electrode in electrical contact with a first end of said electrically conductive sheets; and
   a second electrode in electrical contact with a second end of said electrically conductive sheets;
   wherein two of said plurality of electrically conductive sheets are electrically connected in parallel along their length and are absent a dielectric layer disposed therebetween.

7. The power capacitor assembly of claim 6, wherein said inductive element is disposed within said housing.

8. The power capacitor assembly of claim 7, wherein said plurality of electrically conductive sheets is comprised of aluminum foil.

9. The power capacitor assembly of claim 7, further comprising a layer of dielectric film material disposed on one side of said plurality of electrically conductive sheets.

10. The power capacitor assembly of claim 9, wherein said dielectric film material is polypropylene.

11. The power capacitor assembly of claim 6, wherein said first and second electrodes comprise tinned copper straps.

12. A power capacitor assembly, comprising:
    a housing;
    a bank of power capacitors disposed within said housing, with each individual capacitor in said bank having a generally cylindrical configuration; and
    an induction element disposed within said housing and at one end of said bank or power capacitors, said inductive clement further comprising:
    an pair of electrically conductive sheets rolled and formed into a generally cylindrical body;
    a first electrode in electrical contact with a first end of said pair of electrically conductive sheets; and
    a second electrode in electrical contact with a second end of said pair of electrically conductive sheets;
    wherein said pair of electrically conductive sheets are electrically connected in parallel along their length and are absent a dielectric layer disposed therebetween.

13. The power capacitor assembly of claim 12, wherein said induction element further comprises:
    a plurality of electrically conductive sheets electrically connected in parallel, said plurality of electrically conductive sheets rolled and formed into said generally cylindrical body.

14. The power capacitor assembly of claim 12, wherein said first and second electrodes are disposed within corresponding electrode pockets, said electrode pockets being formed between said plurality of electrically conductive sheets, at opposite ends thereof.

* * * * *